(12) United States Patent
Douglas et al.

(10) Patent No.: US 10,416,043 B2
(45) Date of Patent: Sep. 17, 2019

(54) SPEED OPTIMALITY ANALYSIS FOR EVALUATING THE OPTIMALITY OF A POWERTRAIN

(71) Applicants: Christopher Michael James Douglas, Mt. Vernon, WA (US); Michael Douglas Gerty, Bellingham, WA (US); Mark G. Malowicki, Anacortes, WA (US)

(72) Inventors: Christopher Michael James Douglas, Mt. Vernon, WA (US); Michael Douglas Gerty, Bellingham, WA (US); Mark G. Malowicki, Anacortes, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/632,191

(22) Filed: Jun. 23, 2017

(65) Prior Publication Data
US 2018/0372057 A1 Dec. 27, 2018

(51) Int. Cl.
*F02P 5/15* (2006.01)
*G01M 17/00* (2006.01)
(Continued)

(52) U.S. Cl.
CPC ............ *G01M 17/00* (2013.01); *B60W 10/10* (2013.01); *B60W 40/10* (2013.01); *F02D 11/105* (2013.01); *F02D 41/1406* (2013.01); *F02P 5/1455* (2013.01); *G07C 5/008* (2013.01); *G07C 5/08* (2013.01); *F02D 2200/0606* (2013.01); *F02D 2200/0625* (2013.01);
(Continued)

(58) Field of Classification Search
CPC .... G01M 15/04; G01M 15/042; G01M 15/05; G01M 17/00; G01M 17/007; G01M 17/0072
USPC .......................................... 73/114.52, 114.53
See application file for complete search history.

(56) References Cited

U.S. PATENT DOCUMENTS 4,466,294 A * 8/1984 Bennington ........ G01M 15/044
73/116.05
6,304,812 B1 * 10/2001 Kolmanovsky ....... F01N 3/0842
701/103
(Continued)

FOREIGN PATENT DOCUMENTS

WO 2015/134376 A1 9/2015

OTHER PUBLICATIONS

Extended European Search Report dated Nov. 15, 2018, issued in corresponding European Application No. 18177710.3, filed Jun. 14, 2018, 10 pages.

*Primary Examiner* — Sizo B Vilakazi
*Assistant Examiner* — Kevin R Steckbauer
(74) *Attorney, Agent, or Firm* — Christensen O'Connor Johnson Kindness PLLC (57) ABSTRACT

Systems and methods for improving fuel economy in vehicles such as Class 8 trucks are provided. In some embodiments, signals indicating states of the powertrain are collected and used to generate fuel rate optimization values. Fuel rate optimization values may indicate a difference between optimum fuel flow rates and actual fuel flow rates during a vehicle drive cycle. Recorded fuel rate optimization values may be used to compare different vehicle configurations during testing, and may also be used to evaluate vehicle performance during real-world operation.

12 Claims, 6 Drawing Sheets

(51) Int. Cl.
*B60W 40/10* (2012.01)
*F02D 41/14* (2006.01)
*G07C 5/00* (2006.01)
*G07C 5/08* (2006.01)
*B60W 10/10* (2012.01)
*F02D 11/10* (2006.01)
*F02P 5/145* (2006.01)
*G01M 17/007* (2006.01)
*G01M 15/04* (2006.01)
*G01F 9/00* (2006.01)

(52) U.S. Cl.
CPC .. *F02D 2200/101* (2013.01); *F02D 2200/501* (2013.01); *F02P 5/1514* (2013.01); *G01F 9/00* (2013.01); *G01M 15/04* (2013.01); *G01M 17/0072* (2013.01)

(56) References Cited

U.S. PATENT DOCUMENTS

| | | | | |
|---|---|---|---|---|
| 6,352,490 | B1* | 3/2002 | Makki | B60W 10/06 123/295 |
| 6,356,831 | B1* | 3/2002 | Michelini | B60W 10/06 340/438 |
| 7,454,962 | B2* | 11/2008 | Nishiyama | G01F 9/02 73/114.52 |
| 7,954,579 | B2* | 6/2011 | Rodriguez | B60W 10/08 180/65.265 |
| 7,966,121 | B2* | 6/2011 | Aoyagi | B60W 50/14 701/123 |
| 8,050,856 | B2* | 11/2011 | Duty | B60W 10/02 180/338 |
| 8,689,618 | B2* | 4/2014 | Engstrom | G01M 17/0074 73/116.05 |
| 9,026,414 | B2* | 5/2015 | Johnson | B60W 30/1843 703/8 |
| 9,091,616 | B2* | 7/2015 | Moeckly | F02C 9/00 |
| 9,097,197 | B2* | 8/2015 | Jiang | F02D 13/0215 |
| 9,239,995 | B2 | 1/2016 | Oshiro et al. | |
| 9,268,882 | B2 | 2/2016 | Slaton et al. | |
| 9,328,674 | B2* | 5/2016 | Geveci | F02D 29/02 |
| 9,659,144 | B2* | 5/2017 | Johnson | B60W 30/1843 |
| 9,890,851 | B2* | 2/2018 | Anderson | F16H 61/0213 |
| 10,174,832 | B2* | 1/2019 | Anderson | F16H 61/0213 |
| 2007/0176762 | A1* | 8/2007 | Aoyagi | B60W 50/14 340/439 |
| 2007/0256481 | A1* | 11/2007 | Nishiyama | G01F 9/02 73/114.52 |
| 2008/0262712 | A1* | 10/2008 | Duty | B60W 10/02 701/123 |
| 2009/0198396 | A1* | 8/2009 | Rodriguez | B60W 10/08 701/22 |
| 2010/0010724 | A1 | 1/2010 | Tripathi et al. | |
| 2010/0100292 | A1* | 4/2010 | Lv | F02D 29/06 701/60 |
| 2010/0292934 | A1* | 11/2010 | Stark | G01F 1/363 702/24 |
| 2011/0303000 | A1* | 12/2011 | Engstrom | G01M 17/0074 73/116.06 |
| 2012/0253637 | A1* | 10/2012 | Jiang | F02D 13/0215 701/102 |
| 2013/0144581 | A1* | 6/2013 | Johnson | B60W 30/1843 703/8 |
| 2014/0277971 | A1* | 9/2014 | Oshiro | B60W 50/14 701/51 |
| 2014/0365036 | A1* | 12/2014 | Moeckly | F02C 9/00 701/3 |
| 2015/0226135 | A1* | 8/2015 | Geveci | F02D 29/02 701/22 |
| 2015/0278430 | A1* | 10/2015 | Johnson | B60W 30/1843 703/8 |
| 2017/0206307 | A1* | 7/2017 | Johnson | B60W 30/1843 |
| 2017/0268948 | A1* | 9/2017 | List | G01L 5/13 |
| 2018/0040176 | A1* | 2/2018 | Ogawa | G01M 17/007 |
| 2018/0252567 | A1* | 9/2018 | Buteau | G01F 9/001 |

* cited by examiner

SPEED OPTIMALITY ANALYSIS FOR EVALUATING THE OPTIMALITY OF A POWERTRAIN

BACKGROUND

Improving fuel economy in vehicles is an important goal. Many technologies are being applied to optimize efficiency, including but not limited to displaying progressive shift indicators, predictive neutral coast, and the like. However, there is currently no way to characterize actual fuel consumption performance that can be compared across differing power demands. Existing techniques for characterizing fuel consumption may simply look at fuel rate in isolation, or may consider overall fuel consumption. However, using these techniques does not take into account changing power demands. For example, a Class 8 truck towing a heavy load would be expected to consume more fuel over a given drive cycle than the same truck towing a light load, but the consumption of more fuel in the first scenario should not be considered less efficient. Further, existing techniques do not allow for performance of vehicles in the field to be compared apples-to-apples to performance of test configurations in order to troubleshoot issues or further improve efficiency. What is needed are new systems and techniques that allow for comparison of fuel consumption efficiency across different loads and operating conditions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle is provided. The vehicle comprises a powertrain, an engine control unit (ECU), one or more sensors configured to generate signals indicating one or more states of the powertrain and to transmit the signals to the ECU, and a nontransitory computer-readable medium configured to provide a performance data store. The ECU is configured to receive the signals indicating one or more states of the powertrain from the one or more sensors, calculate at least one fuel rate optimization value based on the received signals, and store the at least one fuel rate optimization value for the time period in the performance data store.

In some embodiments, a system for improving fuel economy in a vehicle is provided. The system comprises a vehicle test fixture configured to receive a drive cycle record from a vehicle analysis system, wherein the drive cycle record indicates a time series of vehicle speed and road grade values; exercise a vehicle under test using the vehicle test fixture based on the drive cycle record; receive sensor data from the vehicle, wherein the sensor data indicates, for each time period of a plurality of time periods, at least an engine power and a fuel usage rate; and determine at least one fuel rate optimization value based on the sensor data.

In some embodiments, a method for configuring a vehicle to have an optimized fuel usage rate over a drive cycle is provided. A set of vehicle configuration records is received. A drive cycle record is received, wherein the drive cycle record includes a time series of road grade values and vehicle speed values. For each vehicle configuration record of the set of vehicle configuration records, a set of actions is performed that includes configuring a test vehicle using the vehicle configuration record; exercising the test vehicle by executing the drive cycle record using a vehicle test fixture; collecting sensor data from the test vehicle while executing the drive cycle; calculating at least one fuel rate optimization value based on the sensor data; and storing the at least one fuel rate optimization value in a performance data store in association with the vehicle configuration record. The fuel rate optimization values in the performance data store are compared. The vehicle is configured using the vehicle configuration record associated with the highest fuel rate optimization value.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
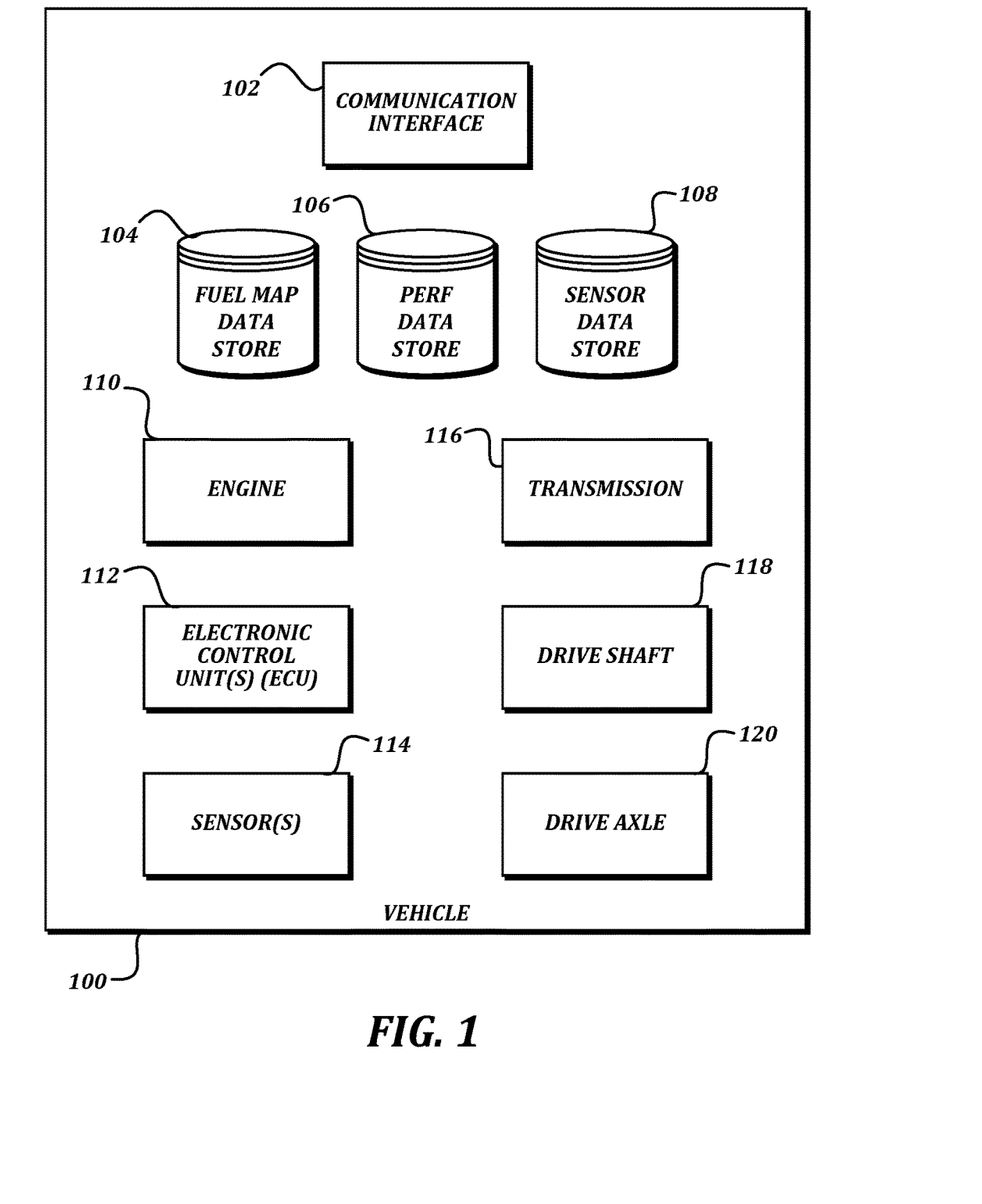
FIG. 1 is a block diagram that illustrates components of a non-limiting example embodiment of a vehicle according to various aspects of the present disclosure.

FIG. 1 is a block diagram that illustrates components of a non-limiting example embodiment of a vehicle according to various aspects of the present disclosure. The vehicle 100 may be any type of vehicle that operates using an internal combustion engine. A typical vehicle 100 is a Class 8 truck, though in some embodiments, the vehicle 100 may be a different kind of truck, a conventional or hybrid automobile, a train, or any other type of vehicle with an internal combustion engine.

As illustrated, the vehicle 100 includes an engine 110, one or more electronic control units (ECUs) 112, one or more sensors 114, a transmission 116, a drive shaft 118, and a drive axle 120. The engine 110, as known to one of ordinary skill in the art, consumes fuel in order to produce power. The power may be used for any purpose, including but not limited to providing motive force, generating electrical energy for other components of the vehicle 100, and so on. The transmission 116 is a mechanism that couples the output of the engine 110 to the remainder of the drivetrain, and often includes multiple switchable gears which may be selected to alter a gear ratio between the output of the engine 110 and the rest of the drivetrain. The drive shaft 118 couples the output of the transmission 116 to the drive axle 120. The drive axle 120 uses the force from the engine 110 (via the transmission 116 and drive shaft 118) to turn the drive wheels of the vehicle 100. In some embodiments, the drive axle 120 may also include gearing that converts the rotational speed of the drive shaft 118 to a rotational speed for the drive wheels. This gearing is referred to as a rear axle ratio, and is generally fixed at the time of manufacture of the vehicle 100.

The ECUs 112 may control the operation of various components of the vehicle 100. For example, one or more ECUs 112 may control fuel amounts, air/fuel ratio, idle speed, variable valve timing, and/or other settings used in operating the engine 110. As another example, one or more ECUs 112 may be used to operate one or more displays presented to a driver of the vehicle 100. As yet another example, one or more ECUs 112 may be used to monitor performance of the vehicle 100 and to store performance information in one or more data stores, as discussed in detail below.

The one or more sensors 114 may be used to monitor conditions on the vehicle 100 or in the area of the vehicle. As some non-limiting examples, an engine speed sensor may detect a speed (e.g., rotations per minute (RPM)) at which the engine 110 is running, an output shaft sensor may detect a speed at which an output shaft of the transmission 116 is turning, a wheel speed sensor may detect a speed at which a wheel of the vehicle is turning, a coolant temperature sensor may detect a temperature of a coolant used to cool the engine 110 or other components, a fuel rate sensor may detect a rate at which fuel is being consumed by the engine 110, a grade sensor may detect a grade being traversed by the vehicle 110, an ambient temperature sensor may detect an air temperature surrounding the vehicle, and so on. Each sensor may generate signals represented the sensed values and provide them to one or more of the ECUs 112.

The above-described vehicle components, including the engine 110, ECUs 112, sensors 114, transmission 116, drive shaft 118, and drive axle 120, are generally known to those of ordinary skill in the art. As such, these components have further features that are known to those of skill in the art, but are not described in detail herein for the sake of brevity.

In some embodiments, the vehicle 100 may also include a fuel map data store 104, a performance data store 106, and a sensor data store 108. In some embodiments, the fuel map data store 104 is configured to store information related to amounts of fuel used and power generated by the engine 110 at various engine speeds. The sensor data store 108 is configured to store information generated by the sensors 114 during operation of the vehicle 100. The performance data store 106 is configured to store fuel rate optimization information calculated by an ECU 112 during operation of the vehicle 100. Further details regarding the information stored in the data stores 104, 106, 108 are provided below.

In some embodiments, the vehicle 100 may also include a communication interface 102. The communication interface 102 may allow data stored on the vehicle 100, such as data from the performance data store 106 or the sensor data store 108, to be transmitted to a vehicle analysis system, as described further below. The communication interface 102 may use any suitable communication technology, including wired connections (such as an on-board diagnostic (OBD) connection such as an OBD-I connector or an OBD-II connector described in SAE Standards J1939, J1962, and/or the like; a Universal Serial Bus (USB) connection, an RJ-45 or Ethernet connection, an EOBD connection; or a JOBD connection; or other wired connection); a short-range wireless connection (such as near-field communication (NFC), Bluetooth, Bluetooth Low Energy, Wi-Fi, or ZigBee); a long-range wireless connection (such as 3G, 4G, LTE, WiMAX, satellite, or microwave); and/or the like.

The components of the vehicle 100 described above may be connected to each other via a vehicle communication network (not illustrated). One example vehicle communication network is a Controller Area Network (CAN bus), though any other networking technology may be used to enable the components to communicate with each other. One of ordinary skill in the art will recognize that a vehicle 100 has numerous other components that are not illustrated or described herein for the sake of brevity. Creating an operational vehicle 100 that includes the equipment and capabilities described herein by including these omitted components is well within the knowledge and abilities of one of ordinary skill in the art.

Figure 2:
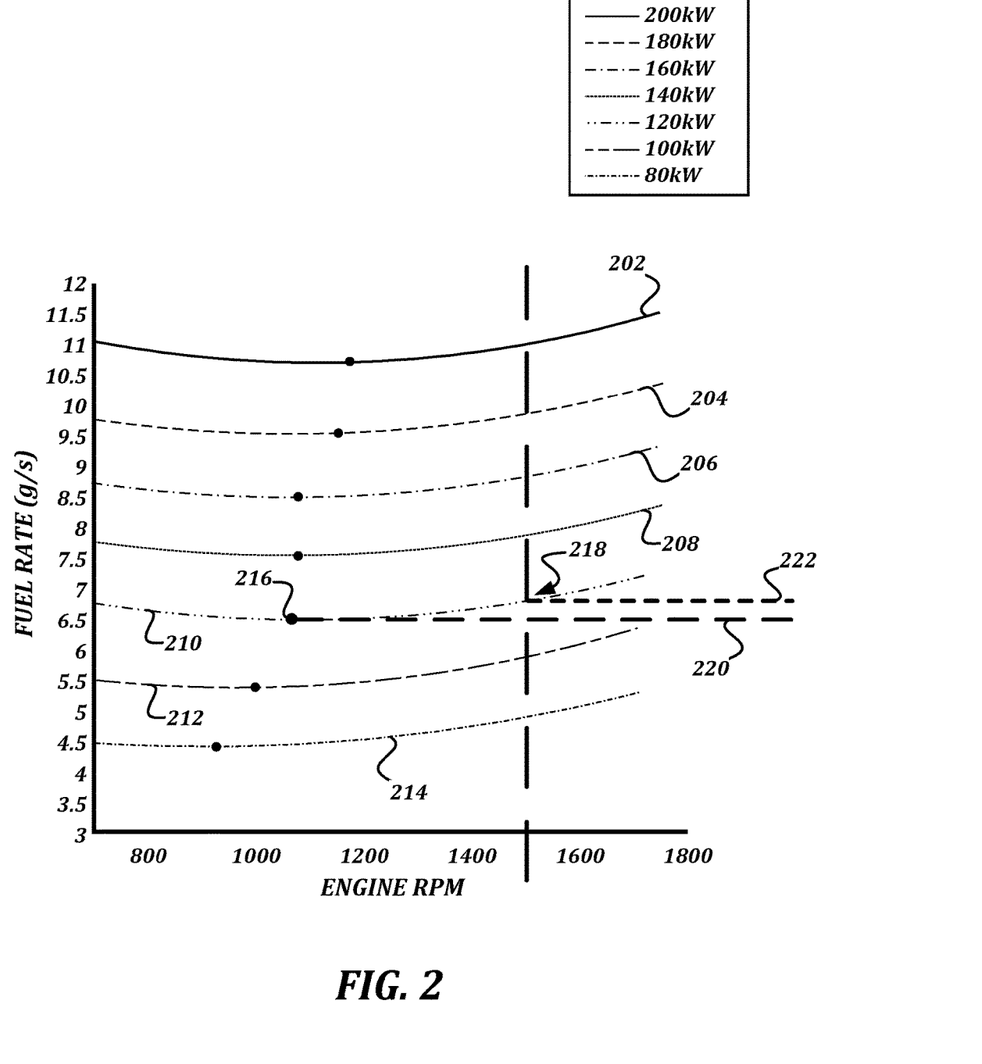
FIG. 2 is a chart that illustrates fuel flow rate at constant power levels according to various aspects of the present disclosure.

FIG. 2 is a chart that illustrates fuel flow rate at constant power levels according to various aspects of the present disclosure. The X-axis of the chart illustrates engine speed in RPM, while the Y-axis of the chart illustrates fuel flow rate in grams per second. The curved lines 202-214 indicate constant power levels. For example, the first curved line 214 indicates combinations of power that generate 80 kW of power, the second curved line 212 indicates combinations of power that generate 100 kW of power, and so on for 120 kW 210, 140 kW 208, 160 kW 206, 180 kW 204, and 200 kW 202. The dot on each curved line is the lowest point on the curve, and indicates the lowest fuel flow rate that can generate the indicated power. For example, the dot 216 on the third curved line 210 indicates that the engine can most efficiently generate 120 kW of power by using about 6.5 g/s of fuel and running the engine at about 1050 RPM. This chart is an example of information that may be stored in the fuel map data store 104.

During operation of a vehicle 100, an ECU 112 may obtain a combination of values including two or more of an engine speed, a fuel rate, and a power from various sensors 114. The ECU 112 may use these values to determine where on the chart the actual performance of the vehicle 100 was located. For example, a reading obtained from a vehicle 100 may indicate that the engine 110 was operating at 1500 RPM and that the fuel rate was about 7 g/s. This would place the engine performance at point 218 on the third curved line 210, indicating that the engine was generating 120 kW of power. By determining the lowest fuel flow rate that can generate the power level being used (e.g., the dot 216 on the third curved line 210), a calculation can be made to quantify how close the actual performance of the vehicle 100 was to the optimum performance. In some embodiments, this calculation may be performed by dividing the optimum fuel flow rate at the power level being used by the actual fuel flow rate being used to generate a fuel rate optimization value. In FIG. 2, the optimum fuel flow rate is indicated by a first dashed line 220, and the actual fuel flow rate is indicated by a second dashed line 222.

Low fuel rate optimization values may indicate that the vehicle 100 should be reconfigured to run at lower engine speeds for similar power demands. For example, the gearing of the transmission 116 and/or the rear axle ratio may be causing the engine 110 to run at higher speeds to achieve given vehicle speeds. Increasing one or more gear ratios in the transmission 116 and/or the rear axle ratio will cause the engine to run at lower speeds to obtain the same vehicle speeds, and thereby have a higher fuel rate optimization value. This may be particularly useful in line haul scenarios, wherein the vehicle 100 will be operating at a highway speed limit in a highest transmission gear for large portions of its drive cycle, such that using a faster rear axle ratio will cause the engine speed to be lower for these portions of the drive cycle.

Figure 3:
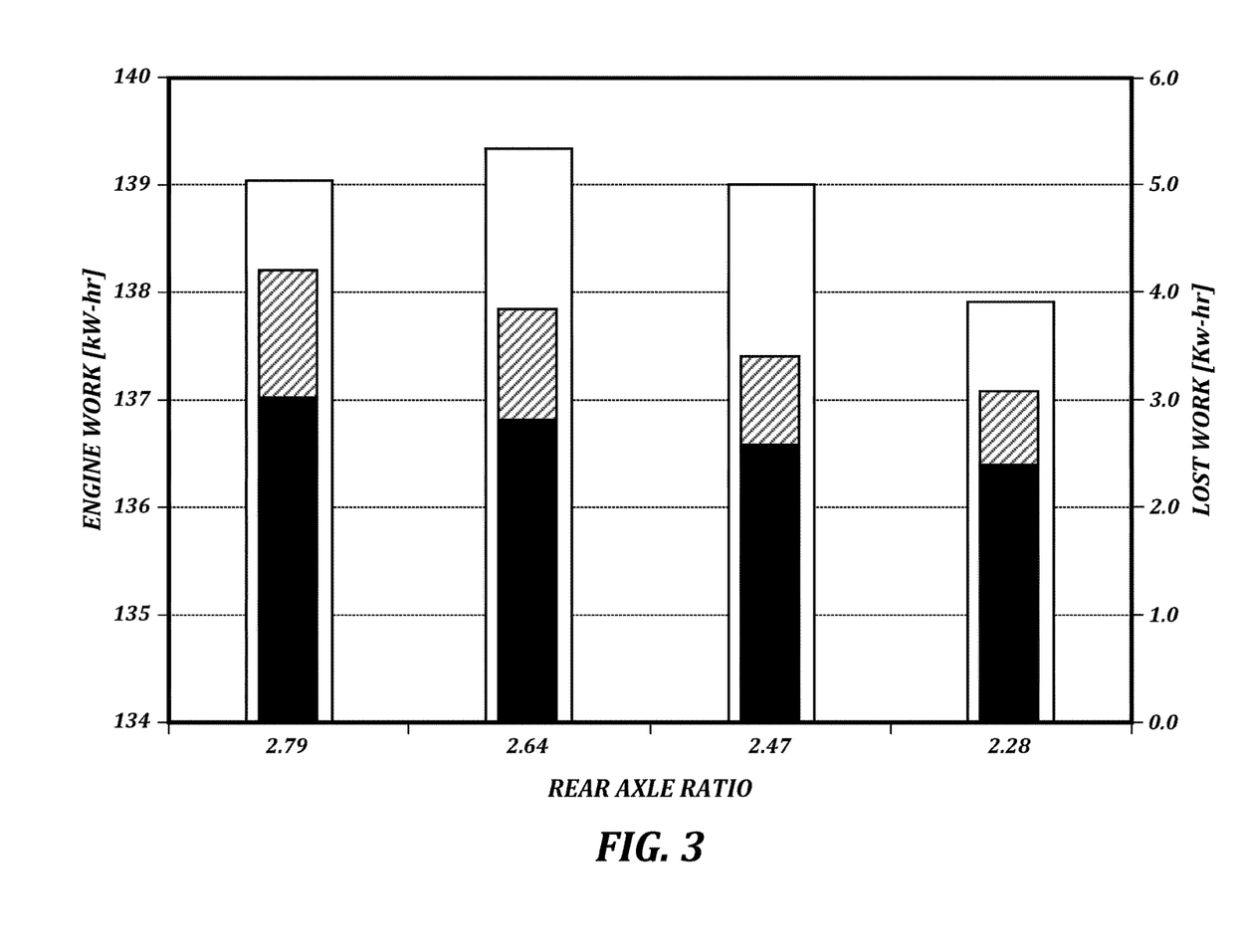
FIG. 3 is a chart that illustrates example measurements of lost work during simulated drive cycles according to various aspects of the present disclosure.

While using a faster rear axle ratio may provide fuel efficiency improvements in some drive cycles and for some vehicle configurations, it can also be shown that changes other than a faster rear axle ratio may also be desirable. FIG. 3 is a chart that illustrates example measurements of lost work during simulated drive cycles according to various aspects of the present disclosure. The horizontal scale shows four different rear axle ratios tested in four separate drive cycles. The hollow bars show an amount of engine work, as measured in kW/hr as indicated on the left-most vertical scale. The solid bars show amounts of lost work due to the drive axle, as measured in kW/hr. The striped bars show amounts of lost work within the transmission. The work lost in the transmission and drive axle may be from any source, including but not limited to churning losses (e.g, gears dragging through oil, temperature effects on bearings and seals) and friction losses.

The lost work may be measured using any suitable sensors and/or derivations. For example, a reading may be taken from a sensor of the engine in order to determine the amount of work being performed by the engine. Corresponding readings may be taken from a sensor coupled to the transmission to determine the amount of work being performed by the transmission, a sensor coupled to the drive wheels to determine the amount of work being transferred to the road or test fixture, and/or the like, and the sensor readings may be used to derive the lost work due to the transmission and the lost work due to the drive axle.

The results shown in the chart illustrate that simply switching to a faster rear axle ratio may not always be the best or only way to obtain fuel efficiency gains. For example, when moving from rear axle ratio 2.79 to 2.64, the amount of work performed by the engine actually went up, though the percentage of engine work lost in the transmission and drive axle went down significantly. Also, moving from 2.79 to 2.47 did not result in a significantly lower amount of engine work, but it did reduce the lost work in the drive axle (from about 3.033 to about 2.587) and also reduced the lost work in the transmission (from about 1.162 to about 0.819). Moving further to 2.28, the amount of engine work, transmission lost work, and drive axle lost work all fall. Such measurements can help aid in analysis of how to further improve fuel efficiency. For example, if two fuel rate efficiency values are close to each other, the lost work values can be consulted to determine which configuration is losing more power to lost work.

Figure 4:
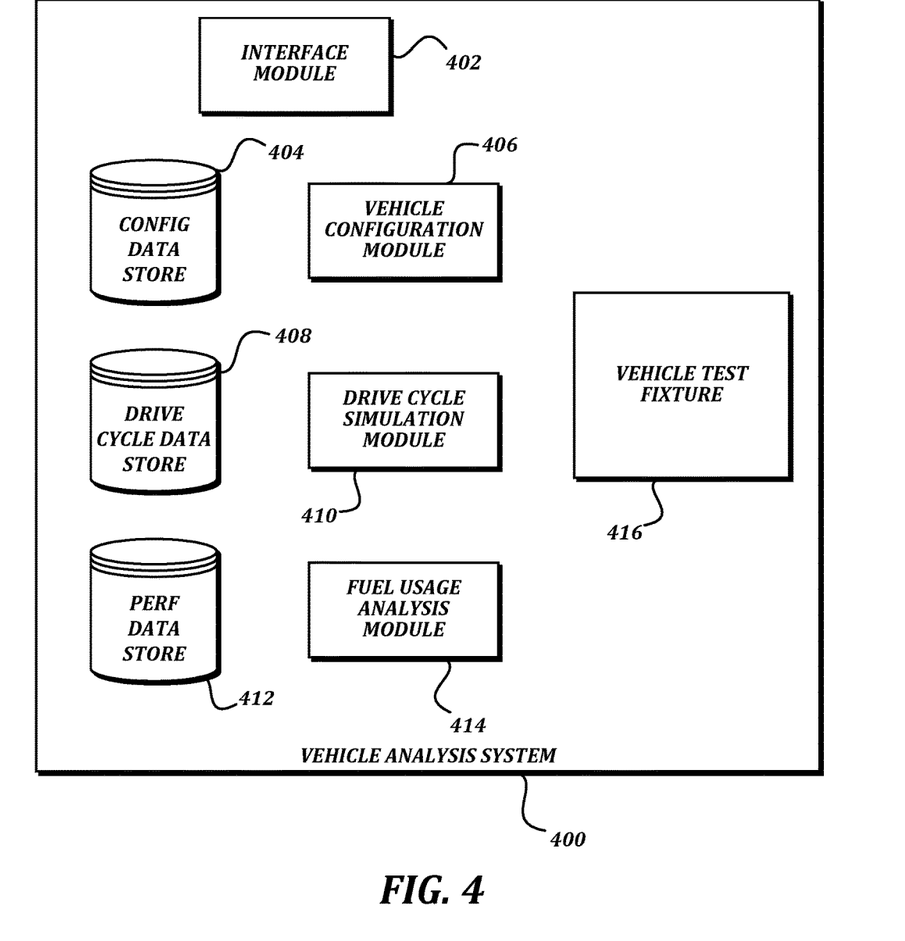
FIG. 4 is a block diagram that illustrates components of a non-limiting example embodiment of a vehicle analysis system according to various aspects of the present disclosure.

FIG. 4 is a block diagram that illustrates components of a non-limiting example embodiment of a vehicle analysis system according to various aspects of the present disclosure. In some embodiments, the functionality of the vehicle analysis system 400 may be provided by one or more computing devices. In some embodiments, the computing devices may be networked together using Ethernet, WiFi, or any other suitable networking technology. In some embodiments, the computing devices may communicate via the exchange of physical media, including but not limited to flash memory devices. In some embodiments, the functionality of the vehicle analysis system 400 may be provided by a single computing device.

In some embodiments, the vehicle analysis system 400 includes one or more of an interface module 402, a vehicle configuration module 406, a drive cycle simulation module 410, and a fuel usage analysis module 414. The vehicle configuration module 406 may be configured to generate, store, and/or manage vehicle configurations based on one or more user-selected components, one or more user-selected performance goals, and/or based on any other suitable criteria. Using the one or more user-selected components or performance goals, the vehicle configuration module 406 may select other compatible components or configurations that will work with the user-selected components or will be able to meet the performance goals. The vehicle configuration module 406 may be configured to generate configuration records for portions of a vehicle as well. For example, the vehicle configuration module 406 may be configured to generate a powertrain configuration based on one or more other features of a vehicle, a performance goal, and/or an optimization goal. One example of a system that can generate vehicle configurations is disclosed in commonly owned U.S. Pat. No. 9,268,882, issued Feb. 23, 2016, the entire disclose of which is hereby incorporated by reference herein for all purposes.

The drive cycle simulation module 410 may be configured to generate, store, and/or manage drive cycle records. In some embodiments, a drive cycle record represents operation of a vehicle over a period of time. In some embodiments, a drive cycle record may include a time series of vehicle speed values and road condition values. Road condition values may indicate a road grade, a road surface condition, and/or other information relating to road load such as a gross vehicular weight (GVW), wind speed, and/or the like. In some embodiments, the drive cycle simulation module 410 may be configured to automatically generate drive cycle records, using a technique similar to those discussed in commonly owned U.S. Pat. No. 9,239,995, issued Jan. 19, 2016, the entire disclosure of which is hereby incorporated by reference herein for all purposes. In some embodiments, the drive cycle simulation module 410 may be configured to receive and use drive cycle records gathered from actual vehicle operations. In some embodiments, the drive cycle simulation module 410 may also be configured to provide drive cycle records to a vehicle test fixture 416 to exercise a vehicle under test, as described further below.

The fuel usage analysis module 414 may be configured to receive engine speed, fuel rate, and/or power level information, and may use the information to compute fuel rate optimization values. The fuel usage analysis module 414 may obtain these values during simulation of a drive cycle by the vehicle test fixture 416, or from a vehicle during actual operation. The fuel usage analysis module 414 may store computed fuel rate optimization values in a performance data store 412.

The interface module 402 may be configured to provide one or more interfaces to access the functionality of the vehicle analysis system 400. For example, the interface module 402 may provide a user interface via web-centric technologies, via an application programming interface (API) and a corresponding client-side interface component, or via any other suitable technique, in order to allow the vehicle analysis system 400 to be configured and managed by a user, and/or to allow a user to access information stored within the vehicle analysis system 400. As another example, the interface module 402 may include an API that allows programmatic access to functionality of the vehicle analysis system 400, including but not limited to allowing the communication interface 102 on the vehicle 100 to transmit information to the vehicle analysis system 400 via a wireless or wired connection.

In general, the word "module," as used herein, refers to logic embodied in hardware or software instructions, which can be written in a programming language, such as C, C++, C#, COBOL, JAVA™, PHP, Perl, HTML, CSS, JavaScript, VBScript, ASPX, Microsoft .NET™, and/or the like. A module may be compiled into executable programs or written in interpreted programming languages. Modules may be callable from other modules or from themselves. Generally, the modules described herein refer to logical components that can be merged with other modules, or can be divided into sub-modules. The modules can be stored in any type of computer-readable medium or computer storage device and be stored on and executed by one or more general purpose computers, thus creating a special purpose computer configured to provide the module.

In some embodiments, the vehicle analysis system 400 includes a vehicle test fixture 416. The vehicle test fixture 416 may be capable of exercising a vehicle (or a portion thereof) coupled to the vehicle test fixture 416, and providing information gathered by the vehicle under test back to other components of the vehicle analysis system 400. In some embodiments, the vehicle test fixture 416 may include a chassis dynamometer that is configurable to provide varying load to the vehicle under test. Further details regarding how the vehicle test fixture 416 may exercise the vehicle according to instructions received from the drive cycle simulation module 410 are provided below.

In some embodiments, the vehicle analysis system 400 includes one or more of a configuration data store 404, a drive cycle data store 408, and a performance data store 412. In some embodiments, the configuration data store 404 may be configured to store vehicle configuration records and/or powertrain configuration records. The records may indicate configurations of a given vehicle that is manufactured and delivered to a customer, and/or may indicate a standard configuration that may be used in a vehicle that is tested using the vehicle analysis system 400 and/or used for a vehicle manufactured and delivered to a customer. The configuration records may include information such as an engine type, a set of transmission gear ratios, a rear axle ratio, and/or any other vehicle or powertrain configuration information.

In some embodiments, the drive cycle data store 408 may be configured to store one or more drive cycle records. As discussed above, a drive cycle record may include information that represents operation of a vehicle over a period of time, either as measured during actual vehicle operation or as calculated by a simulated vehicle drive cycle generation system. In some embodiments, the performance data store 412 may be configured to store performance data collected from vehicles, either while under test by the vehicle analysis system 400 or while in real-world operation.

As understood by one of ordinary skill in the art, a "data store" as described herein may be any suitable device configured to store data for access by an ECU 112, a module, or another computing device. One example of a data store is a relational database management system (RDBMS). However, any other suitable storage technique and/or device capable of organizing and storing the data may be used, such as a key-value store, an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, and/or the like. Such a data store may be likely to be used locally by the vehicle 100. One example of a data store is a highly reliable, high-speed RDBMS executing on one or more computing devices and accessible over a high-speed packet switched network. Such a data store may be likely to be used by the vehicle analysis system 400. One of ordinary skill in the art will recognize that separate data stores described herein may be combined into a single data store, and/or a single data store described herein may be separated into multiple data stores, without departing from the scope of the present disclosure.

One of ordinary skill in the art will recognize that the configuration of the vehicle analysis system 400 illustrated in FIG. 4 is only an example. In some embodiments, various components of the vehicle analysis system 400 may be combined with each other to make single components having the combined functionality of the separate components. In some embodiments, the vehicle test fixture 416 may be separate from one or more computing devices that provide the modules and/or data stores. In some embodiments, one or more of the modules and/or data stores may be provided by the vehicle test fixture 416 instead of by one or more separate computing devices of the vehicle analysis system 400. In some embodiments, some functionality of one or more of the modules or data stores may be provided by a component of the vehicle under test. For example, portions of the functionality of the fuel usage analysis module 414 may be provided by an ECU 112 of the vehicle 100, which may provide information back to the vehicle analysis system 400 via the interface module 402.

Figure 5:
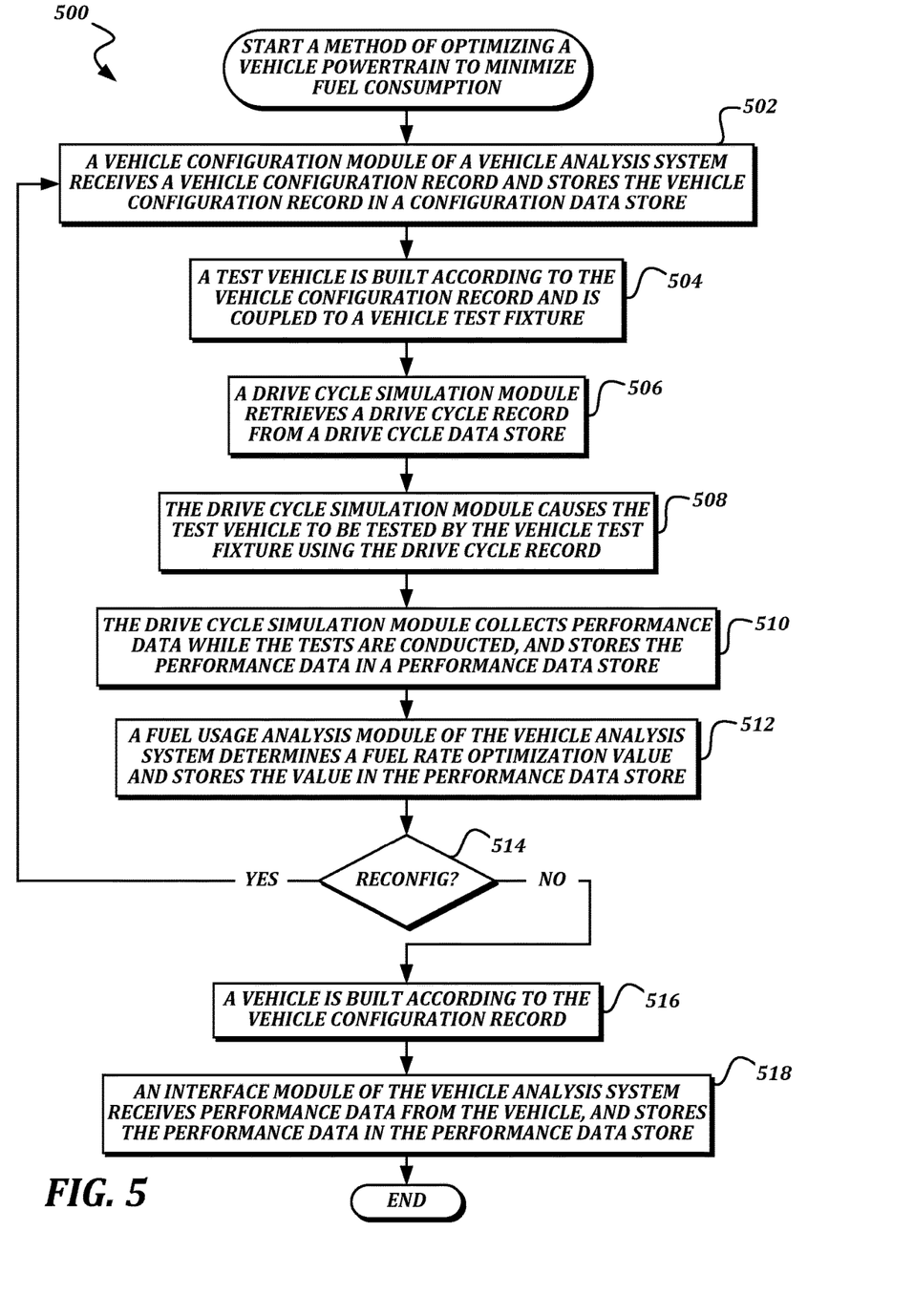
FIG. 5 is a flowchart that illustrates a non-limiting example embodiment of a method of optimizing a vehicle powertrain to minimize fuel consumption according to various aspects of the present disclosure.

FIG. 5 is a flowchart that illustrates a non-limiting example embodiment of a method of optimizing a vehicle powertrain to minimize fuel consumption according to various aspects of the present disclosure. From a start block, the method 500 proceeds to block 502, where a vehicle configuration module 406 of a vehicle analysis system 400 receives a vehicle configuration record and stores the vehicle configuration record in a configuration data store 404. The vehicle configuration record may include any type of configuration information used to configure the vehicle 100, including but not limited to particular components included in the vehicle 100 (including but not limited to an engine model, a set of transmission gear ratios, and a rear axle ratio) and data stored by the vehicle 100 as configured (including but not limited to a fuel map for the selected engine model, progressive shift settings, and gear down protection settings). In some embodiments, the vehicle configuration module 406 may receive the vehicle configuration record as a result of user entries made in an interface provided by the interface module 402. In some embodiments, the interface module 402 may receive some user selections of components or settings to be added to the vehicle configuration record, and the vehicle configuration module 406 may generate additional components or settings that are compatible with the user selections. In some embodiments, the vehicle configuration module 406 may automatically generate multiple vehicle configuration records using multiple various valid combinations of components in order to do comparative testing. In some embodiments, the vehicle configuration records may be created using a separate utility and may be provided to the vehicle configuration module 406 in whole via the interface module 402. In some embodiments, a vehicle configuration record may be retrieved from or otherwise based on a previously configured vehicle.

At block 504, a test vehicle is built according to the vehicle configuration record and is coupled to a vehicle test fixture 416. If the vehicle configuration record was based on an existing vehicle that is to be tested, then block 504 could be omitted. In some embodiments, the vehicle test fixture 416 may include an engine dynamometer or other fixture that can test the engine 110 and transmission 116 in isolation from the rest of the vehicle 100. In this case, the engine 110, transmission 116, and any appropriate ECUs 112 and/or sensors 114 may be coupled to the vehicle test fixture 416, instead of building an entire test vehicle. In such embodiments the vehicle test fixture 416 may provide additional simulated input to the sensors 114 and/or ECUs 112 to simulate an entire vehicle 100.

At block 506, a drive cycle simulation module 410 retrieves a drive cycle record from the drive cycle data store 408. Next, at block 508, the drive cycle simulation module 410 causes the test vehicle to be tested by the vehicle test fixture 416 using the drive cycle record. In some embodiments, the drive cycle simulation module 410 may transmit the time series of vehicle speed values and road condition values from the drive cycle record to the vehicle test fixture 416, and the vehicle test fixture 416 will cause the test vehicle (or isolated powertrain components) to operate at the specified vehicle speed while applying a resistance force to simulate the road condition.

At block 510, the drive cycle simulation module 410 collects performance data while the tests are conducted by the vehicle test fixture 416, and stores the performance data in a performance data store 412. In some embodiments, the performance data may include at least two of engine speed data, fuel rate data, and engine power output data. In some embodiments, the performance data may be collected at regular intervals in a time series. In some embodiments, the time series of performance data may be collected at a similar interval as the time series of values in the drive cycle record. In some embodiments, the time series of performance data may be collected at a higher rate as limited by processing speed and storage constraints.

At block 512, a fuel usage analysis module 414 of the vehicle analysis system 400 determines a fuel rate optimization value and stores the fuel rate optimization value in the performance data store 412. The fuel rate optimization value may be stored in association with the vehicle configuration record, such that a record of the fuel rate optimization value for the vehicle configuration record is created. The fuel rate optimization value may also be stored in association with the drive cycle record. In this way, the performance of vehicles configured according to the various vehicle configuration records may be compared, whether for the same drive cycle or over different drive cycles.

In some embodiments, a fuel rate optimization value may be generated for each entry in the time series of performance data collected, and an average (or other statistical manipulation) of the fuel rate optimization values may be generated to create an overall fuel rate optimization value for the drive cycle record and/or vehicle configuration record. As discussed above, the fuel rate optimization value may be calculated by determining an actual fuel rate used by the vehicle, determining an optimum fuel rate to generate the same amount of power, and dividing the optimum fuel rate by the actual fuel rate. For example, as illustrated in FIG. 2, if the actual fuel rate was determined to be 6.8 g/s and the engine was producing 120 kW of power, the fuel map for the engine may be consulted to determine that the optimum fuel rate to produce 120 kW of power is 6.5 g/s. Dividing 6.5 g/s by 6.8 g/s indicates a fuel rate optimization value of approximately 95.59% for these performance data.

The method 500 then proceeds to a decision block 514, where a test is performed to determine whether a different vehicle configuration should be tested. In some embodiments, the method 500 may loop over a variety of vehicle configuration records, such as if multiple rear axle ratios, progressive shift settings, or sets of transmission gear ratios are being tested for a given test vehicle. In some embodiments, the fuel rate optimization value may be compared to a threshold to determine whether the test vehicle exhibited acceptable performance, and if not, the test vehicle may be reconfigured and retested.

If it is determined that a different powertrain configuration should be tested, then the result of the test at decision block 514 is YES, and the method 500 returns to block 502. Otherwise, the result of the test at decision block 514 is NO, and the method 500 proceeds to block 516.

At block 516, a vehicle 100 is built according to the vehicle configuration record. In some embodiments, the vehicle configuration record may be the vehicle configuration record tested in blocks 504-512. In some embodiments, the vehicle configuration record may be any other vehicle configuration record stored in the configuration data store 404. In some embodiments, the vehicle configuration record (and/or a unique identifier thereof) may be stored by a component of the vehicle 100.

At this point, the configured vehicle 100 may be operated in real-world conditions. Certain actions of the vehicle 100 may duplicate, or at least may be represented by, one or more drive cycle records stored in the drive cycle data store 408. For example, a drive cycle record may represent traveling east on Interstate 90 between Seattle and Spokane. Subsequently, the vehicle 100 may actually travel east on I-90 between Seattle and Spokane. The sensor data store 108 and/or the performance data store 106 of the vehicle 100 may store sensor data or performance data while the vehicle 100 is traveling. In some embodiments, a driver may instigate sensor data and/or performance data recording. In some embodiments, the vehicle 100 may be configured to constantly record sensor data and/or performance data, and portions of the performance data that correspond to drive cycle records may be determined by GPS, manual tagging, profile matching, and/or the like. In some embodiments, sensor data and/or performance data may be collected and stored by the vehicle 100 without associating the data with a drive cycle record.

At block 518, an interface module 402 of the vehicle analysis system 400 receives the performance data from the vehicle 100, and stores the performance data in the performance data store 412. In some embodiments, the vehicle 100 may transmit data from the sensor data store 108 or the performance data store 106 to the vehicle analysis system 400 via the communication interface 102. Accordingly, the transmission could be performed via a wireless connection, a wired connection, or via a removable computer-readable medium. In some embodiments, the vehicle 100 may transmit raw sensor data from the sensor data store 108, and the vehicle analysis system 400 may use the raw sensor data to determine fuel rate optimization values. In some embodiments, the vehicle 100 may calculate fuel rate optimization values from the raw sensor data, and may instead transmit the fuel rate optimization value to the vehicle analysis system 400 in order to save bandwidth and storage space at the vehicle analysis system 400. In some embodiments, the performance data is stored by the vehicle analysis system 400 in association with the vehicle configuration record used to configure the vehicle 100. Accordingly, performance data can be compared to the test performance data determined at block 512 for the vehicle configuration record, if any. This comparison may be useful for multiple reasons, including but not limited to validating the stored performance data in real-world environments; determining if a different vehicle configuration record should be used for the vehicle due to less than predicted performance; and validating that the drive cycle record accurately represents how the vehicle 100 is to be used for performance analysis purposes.

The method 500 then proceeds to an end block and terminates.

Figure 6:
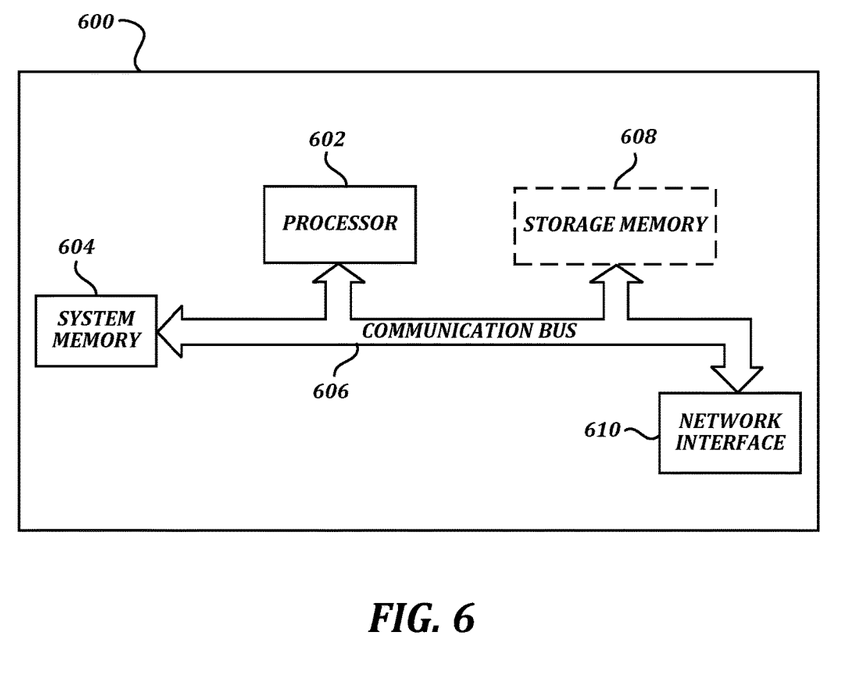
FIG. 6 is a block diagram that illustrates aspects of an exemplary computing device 600 appropriate for use with embodiments of the present disclosure.

FIG. 6 is a block diagram that illustrates aspects of an exemplary computing device 600 appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and
non-volatile and removable and non-removable media implemented in any method or technology capable of storing information, such as computer-readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein. Unless specifically defined herein, all terms used herein have the same meaning as they would to one skilled in the art of the present invention.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for improving fuel economy in a vehicle, the method comprising:
receiving, by a vehicle test fixture, a drive cycle record, wherein the drive cycle record indicates a time series of vehicle speed and road grade values;
exercising, by the vehicle test fixture, a vehicle under test based on the drive cycle record;
receiving, by the vehicle test fixture, sensor data from the vehicle, wherein the sensor data indicates, for each time period of a plurality of time periods, at least an engine power and a fuel usage rate; and
determining, by the vehicle test fixture, at least one fuel rate optimization value based on the sensor data
wherein determining at least one fuel rate optimization value based on the sensor data includes:
for a given time period of the plurality of time periods:
determining an optimal fuel rate for the engine power; and
dividing the optimal fuel rate by the fuel usage rate.

2. The method of claim 1, wherein determining at least one fuel rate optimization value based on the sensor data further includes:
determining fuel rate optimization values for each period of the plurality of time periods; and
determining an overall fuel rate optimization value based on the fuel rate optimization values.

3. The method of claim 1, wherein the vehicle test fixture includes a dynamometer.

4. The method of claim 1, further comprising receiving, by a vehicle analysis system, the determined at least one fuel rate optimization value from the vehicle test fixture.

5. The method of claim 4, further comprising generating, by the vehicle analysis system, at least one vehicle configuration record.

6. The method of claim 4, wherein the vehicle analysis system comprises a configuration data store and a performance data store;
wherein the configuration data store is configured to store a plurality of vehicle configuration records, including a vehicle configuration record associated with the vehicle under test; and
wherein the performance data store is configured to store the at least one fuel rate optimization value in association with the vehicle configuration record associated with the vehicle under test.

7. The method of claim 6, further comprising receiving, by the vehicle analysis system, sensor data from vehicles in the field that were configured according to vehicle configuration records stored in the configuration data store.

8. The method of claim 7, further comprising determining, by the vehicle analysis system, at least one fuel rate optimization value based on the sensor data received by the interface module.

9. A method for configuring a vehicle to have an optimized fuel usage rate over a drive cycle, the method comprising:
receiving a set of vehicle configuration records;
receiving a drive cycle record, wherein the drive cycle record includes a time series of road grade values and vehicle speed values;
for each vehicle configuration record of the set of vehicle configuration records:
configuring a test vehicle using the vehicle configuration record;
exercising the test vehicle by executing the drive cycle record using a vehicle test fixture;
collecting sensor data from the test vehicle while executing the drive cycle;
calculating at least one test fuel rate optimization value based on the sensor data; and
storing the at least one test fuel rate optimization value in a performance data store in association with the vehicle configuration record;
comparing the test fuel rate optimization values in the performance data store; and
configuring the vehicle using the vehicle configuration record associated with the highest test fuel rate optimization value.

10. The method of claim 9, further comprising:
receiving, from the vehicle, sensor data, wherein the sensor data indicates, for each time period of a plurality of time periods, at least an engine power and a fuel usage rate;
determining at least one performance fuel rate optimization value based on the sensor data; and
comparing the determined at least one performance fuel rate optimization value with the test fuel rate optimization value stored in the performance data store.

11. The method of claim 9, wherein calculating the at least one test fuel rate optimization value based on the sensor data includes, for a given time period:
determining a fuel usage rate during the time period based on the received signals;
determining a detected engine power generated during the time period based on the received signals;
retrieving an optimal fuel rate for the detected engine power from a fuel map data store; and
dividing the optimal fuel rate by the fuel usage rate to obtain a test fuel rate optimization value.

12. The method of claim 11, wherein the sensor data indicate at least one of a vehicle speed, an engine power, an engine speed, and a fuel usage rate.

* * * * *